(12) United States Patent
Taleb et al.

(10) Patent No.: US 11,901,830 B2
(45) Date of Patent: Feb. 13, 2024

(54) METHOD FOR CONTROLLING THE INPUT VOLTAGE FREQUENCY OF A DC-DC CONVERTER

(71) Applicant: Renault s.a.s., Boulogne-Billancourt (FR)

(72) Inventors: Miassa Taleb, Yvry sur seine (FR); Abdelmalek Maloum, Chevilly Larue (FR)

(73) Assignee: Renault s.a.s., Boulogne-Billancourt (FR)

( * ) Notice: Subject to any disclaimer, the term of this patent is extended or adjusted under 35 U.S.C. 154(b) by 439 days.

(21) Appl. No.: 17/259,374

(22) PCT Filed: Jun. 24, 2019

(86) PCT No.: PCT/EP2019/066607
§ 371 (c)(1),
(2) Date: Jan. 11, 2021

(87) PCT Pub. No.: WO2020/015953
PCT Pub. Date: Jan. 23, 2020

(65) Prior Publication Data
US 2021/0296999 A1 Sep. 23, 2021

(30) Foreign Application Priority Data

Jul. 16, 2018 (FR) .................................... 18 56534

(51) Int. Cl.
*H02M 3/337* (2006.01)
*B60L 53/20* (2019.01)
(Continued)

(52) U.S. Cl.
CPC ........... *H02M 3/3376* (2013.01); *B60L 53/20* (2019.02); *H02J 7/00* (2013.01); *H02M 1/4208* (2013.01);
(Continued)

(58) Field of Classification Search
CPC ............... H02M 3/01; H02M 3/33573; H02M 3/335376; H02M 3/3376; H02M 1/4208;
(Continued)

(56) References Cited

U.S. PATENT DOCUMENTS

2014/0198536 A1 7/2014 Fu et al.
2015/0263635 A1 9/2015 Fu et al.
(Continued)

OTHER PUBLICATIONS

International Search Report dated Sep. 25, 2019 in PCT/EP2019/066607, citing documents AA, AX and AY therein, 3 pages.
(Continued)

*Primary Examiner* — Yemane Mehari
(74) *Attorney, Agent, or Firm* — Oblon, McClelland, Maier & Neustadt, L.L.P.

(57) ABSTRACT

A method for controlling the input voltage frequency of a DC-DC converter includes defining a setpoint voltage value, computing a control frequency value of the DC-DC converter as a function of the battery voltage, a power setpoint, and the setpoint input voltage, and applying the control frequency to the converter.

7 Claims, 3 Drawing Sheets

(51) Int. Cl.
- *H02M 3/335* (2006.01)
- *H02J 7/00* (2006.01)
- *H02M 1/42* (2007.01)
- *H02M 3/00* (2006.01)

(52) U.S. Cl.
CPC ......... *H02M 3/01* (2021.05); *H02M 3/33573* (2021.05); *B60L 2210/10* (2013.01); *B60L 2240/527* (2013.01); *H02J 2207/20* (2020.01)

(58) Field of Classification Search
CPC ................. B60L 53/20; B60L 2210/10; B60L 2240/527; H02J 7/00; H02J 2207/20
USPC .......................................................... 363/17
See application file for complete search history.

(56) References Cited

U.S. PATENT DOCUMENTS

| 2017/0033701 A1* | 2/2017 | Fu | H02M 3/33576 |
| 2017/0080808 A1* | 3/2017 | Bai | B60L 53/00 |
| 2017/0085106 A1* | 3/2017 | Bai | H02J 7/00 |

OTHER PUBLICATIONS

Anders Lind, "LLC Converter Design Note", Design Note AN Mar. 2013, v1.0, XP055586415, Mar. 31, 2013, pp. 1-19. Retrieved from the Internet: https://www.mouser.com/pdfdocs/2-11.pdf [retrieved on May 7, 2019].

Reza Beiranvand et al., "Using LLC Resonant Converter for Designing Wide-Range Voltage Source" IEEE Transactions on Industrial Electronics, vol. 58, No. 5, XP011352895, May 1, 2011, pp. 1746-1756, DOI: 10.1109/TIE.2010.2052537, ISSN: 0278-0046.

* cited by examiner

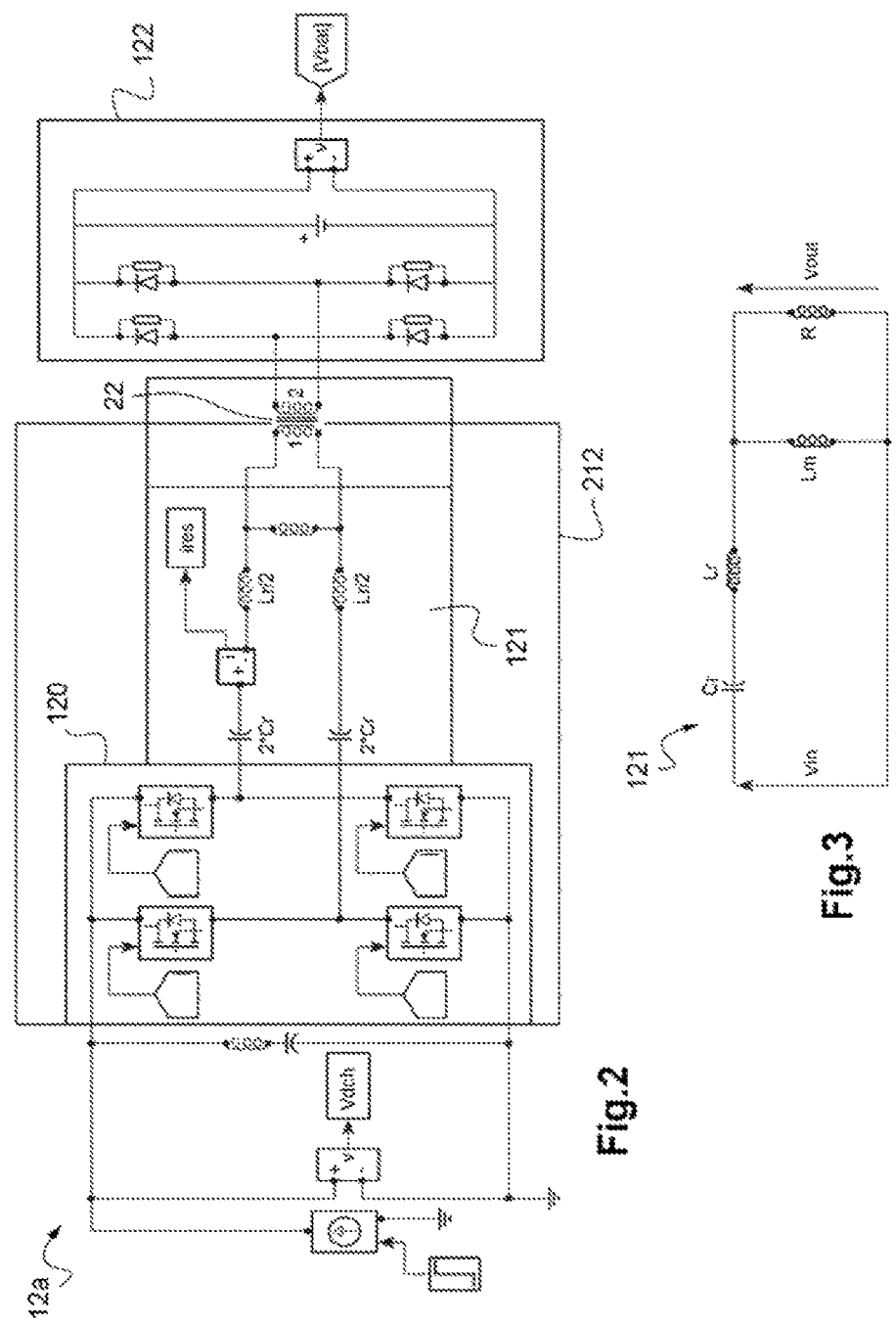

METHOD FOR CONTROLLING THE INPUT VOLTAGE FREQUENCY OF A DC-DC CONVERTER

FIELD

The present invention relates to the field of electrical accumulator chargers, in particular for electric or hybrid motor vehicles.

More specifically, the invention relates to a method for controlling the frequency of the input voltage of a DC-to-DC converter for an electrical accumulator charger.

BACKGROUND

Electrical accumulator chargers, more commonly known as chargers, for electric motor vehicles require high levels of charging power, which can range up to 22 kW in three-phase operation or 7 kW in single-phase operation, for example.

These chargers generally comprise two power conversion stages: a first power factor correction (generally known by the acronym PFC) stage, which performs AC-to-DC conversion of the grid voltages to a DC bus, and a second DC-to-DC conversion stage, which controls the output current required for charging the battery and galvanically isolates the charger by virtue of a transformer.

With reference to prior art FIG. 1, two output DC voltage buses, at the terminals of the output capacitors, are each coupled to a DC-to-DC converter.

The DC-to-DC converter may in particular be an LLC DC-to-DC converter, as shown in FIG. 2, comprising a transformer 22 that galvanically isolates the charger.

FIG. 3 shows a simplified circuit diagram of the DC-to-DC converter of FIG. 2, comprising a capacitor Cr and two inductors Lr and Lm. The input voltage corresponds to the DC bus and the output voltage is the voltage of the battery. The gain then corresponds to the ratio of the two voltages.

The first MOSFET bridge 120 of the LLC DC-to-DC converter operates with a duty cycle of 50% and is frequency-controlled. Indeed, frequency control allows the gain of the DC-to-DC converter to be adjusted and the voltage of the DC buses at the input of the charger to be set to a given setpoint. Depending on the voltage of the battery and the required power, the frequency may fluctuate, for example, between 60 kHz and 200 kHz.

The solutions proposed in the prior art for controlling DC-to-DC converters of this type generally involve operations of regulating the output voltage, such as the one disclosed in the publication DRGOŇA, Peter, FRIVALD-SKÝ, Michal, and SIMONOVÁ, Anna. *A New Approach of Control System Design for LLC Resonant Converter. In: MATLAB for Engineers—Applications in Control, Electrical Engineering, IT and Robotics. InTech,* 2011, in which the output voltage of the DC-to-DC converter is controlled by using the chopping frequency. A transfer function between duty cycle and output voltage is derived by means of identification methods by using a PSPICE hardware model that simulates dynamics of the output voltage responses to a frequency step. A controller is then designed on the basis of the previously derived transfer function.

The transfer function can also be obtained by the method known as the "small-signal" method, which consists in deriving a transfer function from an excitation around a function point and measuring the response of the DC-to-DC converter, as described in the doctoral thesis by YANG, Bo. *Topology investigation of front end DC/DC converter for distributed power system.* 2003. However, this transfer function is valid only at the operating point in question and becomes obsolete every time the operating point changes. The transfer function must therefore be recalculated every time. Therefore, a solution of this kind is relatively complex to implement and costly in terms of computation time.

Control operations that involve regulating DC current if the output voltage varies over a limited range are also known.

Finally, the publication FANG, Zhijian, WANG, Junhua, DUAN, Shanxu et al. *Control of an LLC Resonant Converter Using Load Feedback Linearization. IEEE Transactions on Power Electronics,* 2018, vol. 33, no 1, p. 887-898 also discloses a feedback-linearized control operation for controlling the output voltage of an LLC DC-to-DC converter. This publication describes a non-linear model with 7 states, subsequently reduced to 2 states, and proposes PI-loop control. However, a solution of this kind entails complex and costly hardware and software adaptations.

In some cases, the output voltage is imposed by the battery. Furthermore, in some cases, especially in electric motor vehicle applications, this output voltage varies over a wide range of values, for example between 250 V and 430 V.

Therefore, it is desirable to regulate the DC input voltage since this allows a DC voltage to be imposed across the terminals of the capacitors, at the output of the PFC.

However, regulating the DC input voltage of the LLC DC-to-DC converter is a subject for which the prior art does not offer any satisfactory solution.

There is therefore a need for a solution for quickly and reliably controlling the DC voltage at the input of the LLC DC-to-DC converter. A method is proposed for controlling the frequency of the input voltage of an LLC DC-to-DC converter which operates with a duty cycle of 50% and is frequency-controlled, comprising:
  a preliminary step of defining a setpoint voltage value,
  a step of calculating a control frequency value for said DC-to-DC converter, which is obtained by mathematical inversion of the expression of the gain of said DC-to-DC converter, on the basis of an output battery voltage, an input power setpoint and said setpoint input voltage; and
  a step of applying the control frequency calculated in this way to said converter.

It is thus possible to obtain input control of the DC-to-DC converter relatively simply and quickly.

Advantageously and without implying limitation, said DC-to-DC converter is an LLC series resonant DC-to-DC converter, which is defined by parameters of an equivalent circuit comprising two inductors and a capacitor; said control frequency value being a function of the values of said two inductors and said capacitor. Thus, the calculation of the control frequency is obtained by approximating the operation of the DC-to-DC converter, allowing the calculations to be simplified and the method to be sped up.

Advantageously and without implying limitation, said step of applying the control frequency calculated in this way comprises:
  defining a frequency increment step;
  a step of initializing the control frequency to an initial control value that corresponds to the control frequency calculated in this way;
  defining a first threshold value and a second threshold value, and the additive inverse of the first threshold value and the additive inverse of the second threshold value;

a step of calculating an error value between a measured input voltage value and said setpoint input voltage; and a step of comparing said error value with said threshold values;

the method comprising a regulating step during which:

when said error value is between the first threshold value and the additive inverse of the first threshold value, and when said error is higher than the second threshold value or lower than the additive inverse of the second threshold value, the initial control frequency is incremented by the frequency increment step;

when said error value is between the second threshold value and the additive inverse of the second threshold value, the control frequency is kept at its previous value;

if none of these conditions is met, the initial control value is applied as the control frequency.

Thus, the method comprises relatively simple, quick and robust frequency control.

According to one particular embodiment of the invention, the method comprises feedback control of the control frequency.

The invention also relates to a device for implementing a method as described above.

The invention also relates to a charger for electrical accumulators comprising a power factor correction stage, at least one DC-to-DC converter and a device as described above.

The invention also relates to a motor vehicle comprising a charger for electrical accumulators as described above.

BRIEF DESCRIPTION OF THE DRAWINGS

Other distinctive features and advantages of the invention will become apparent upon reading the description provided below of one particular embodiment of the invention, which is given by way of indication but without implying limitation, with reference to the appended drawings, in which:

FIG. 2 is a detailed view of a DC-to-DC converter for a charger according to FIG. 1;

FIG. 3 is a simplified diagram of an LLC circuit of a DC-to-DC converter according to FIG. 2.

Since FIGS. 1 to 4 relate to the same embodiment, they will be discussed at the same time.

DETAILED DESCRIPTION

Figure 1:
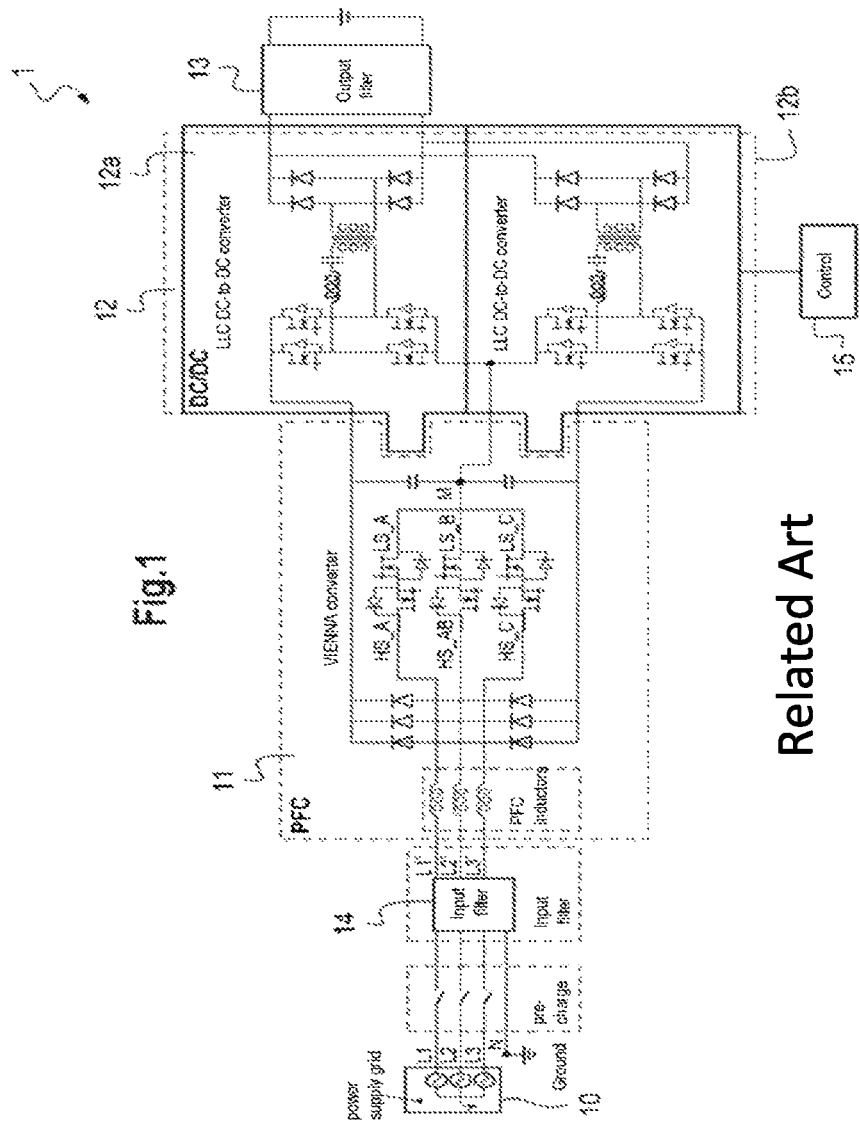
FIG. 1 is a schematic view of a charger for electrical accumulators that is known from the prior art.

With reference to FIG. 1, a charger 1 for electrical accumulators 13, which is connected to a three-phase electricity grid 10, comprises a power factor correction stage 11, also known as PFC stage 11, and DC-to-DC converters 12a and 12b, which each include an inverter 212.

The three-phase electricity grid 10 is connected to an input filter 14, which transmits filtered input currents to the PFC stage 11.

At the output of the PFC 11, two DC voltage buses, which are connected to the terminals of the output capacitors of the PFC stage 11, are each coupled to a DC-to-DC converter 12a, 12b, the outputs of said converters being connected in parallel with a battery of accumulators 13.

Each DC-to-DC converter 12a, 12b, just one example of which is shown in FIG. 2, comprises an input MOSFET bridge 120, an LLC circuit 121, a simplified equivalent depiction of which is shown in FIG. 3, a transformer 22 and an output diode bridge 122.

The charger 1 further comprises means 15 for controlling the DC-to-DC converters 12, which are able to implement a control method 4 according to the invention.

The control method 4 according to the invention aims to control the frequency of the input voltages of the DC-to-DC converters 12.

To this end, the method according to the invention comprises calculating a chopping frequency of the DC-to-DC converter.

With reference to FIG. 3, the transfer function of an LLC DC-to-DC converter according to the invention is known to take the following form:

$$G = \frac{\eta V_{bat}}{V_{dc}} = \frac{V_{out}}{V_{in}} \quad (1)$$

where G is the gain of the transfer function of the DC-to-DC converter (or at least of the inverter part of the DC-to-DC converter up to the primary of the transformer);

$\eta$ is the turns ratio of the transformer of the DC-to-DC converter;

$V_{bat}$ is the voltage across the terminals of the battery, i.e. the output voltage of the DC-to-DC converter;

$V_{dc}$ is the DC input voltage of the DC-to-DC converter;

and in accordance with generic terminology: $V_{out}$ is the output voltage of the DC-to-DC converter, and $V_{in}$ is the input voltage of the DC-to-DC converter.

With reference to FIG. 3, which is a simplified view of the DC-to-DC converter, the equivalent resistance R of the transformer of the DC-to-DC converter corresponds to the battery load referred to the primary of the transformer. R is thus calculated in accordance with the following equation:

$$R = \frac{8}{\pi^2} \left(\frac{N_p}{N_s}\right)^2 \frac{V_{bat}^2}{P} \quad (2)$$

where $N_P$ and $N_S$ are the number of turns at the primary and the secondary of the transformer, respectively, P is the power at the primary of the transformer and $V_{bat}$ is the voltage at the secondary of the transformer.

Hence, the transfer function of equation (1) is written as follows:

The transfer function of this circuit is written as:

$$\frac{V_{out}}{V_{in}} = \frac{R \, L_m C_r \, S^2}{R \, L_m C_r \, s^2 + (L_r C_r s^2 + 1)(R + L_m s)} \quad (3)$$

Thus, in order to calculate the gain of the transfer function of the DC-to-DC converter, the following calculation is performed:

$$G(s) = \left|\frac{V_{out}}{V_{in}}\right| = \left|\frac{\eta V_{bat}}{V_{DC}}\right| = \left|\frac{RL_m C_r s^2}{(L_m L_r C_r s^3 + RC_r(L_m + L_r)s^2 + L_m s + R)}\right| \quad (4)$$

This equation (4) is rewritten as a function of the angular frequency $\omega$ ($\omega=2\pi f_{sw}$), with $s=j\omega$.

The gain equation can therefore be written in accordance with the following equations:

$$G(s) = \left|\frac{V_{out}}{V_{in}}\right| = \left|\frac{nV_{bat}}{V_{DC}}\right| = \left|\frac{R\, L_m C_r (jw)^2}{(L_m L_r C_r (jw)^3 + RC_r(L_m+L_r)(jw)^2 + L_m(jw) + R)}\right|$$

or $$G(s) = \left|\frac{V_{out}}{V_{in}}\right| =$$

$$\left|\frac{nV_{bat}}{V_{DC}}\right| = \left|\frac{RL_m C_r(j2\pi f_{sw})^2}{(L_m L_r C_r(j2\pi f_{sw})^3 + RC_r(L_m+L_r)(j2\pi f_{sw})^2 + L_m(j2\pi f_{sw}) + R)}\right|$$

calculating the gain G of the transfer, so as to obtain an expression for the control frequency $f_{sw}$ in accordance with the equation:

$$f_{sw}(\omega) = fct(Vbat, Preq, Vdc(\text{setpoint})) \quad (5)$$

where $V_{bat}$ is the battery voltage, $V_{dc}$ is the input voltage of the DC-to-DC converter, and Preq is an input power setpoint of the DC-to-DC converter.

Indeed, replacing $V_{dc}$ with a setpoint $V_{dc}$ value in the G(s) expression makes it possible to calculate the frequency for which the DC bus converges with a given voltage, for example 450 V.

The gain G is calculated as being the ratio of $\eta Vbat/Vdc$, i.e. in this embodiment $G = \eta Vbat/450$ V.

A third-order equation dependent on $(\omega = 2\pi f_{sw})$ is derived therefrom:

$$\omega^3 + A\omega/2 + B\omega + C = 0 \quad (6)$$

where the parameters A, B and C are a function of Vbat, Preq, Lm and Lr (the inductance values of the equivalent diagram of the DC-to-DC converter) and Cr (the capacitance value of the equivalent diagram of the DC-to-DC converter).

Solving equation (6) for ω makes it possible to use feedforward control to calculate the control frequency $f_{sw}(\omega)$ of the DC-to-DC converter.

Due to parameter dispersions and degrees of accuracy of calculation, and also due to the simplifying assumptions made in writing the transfer function of the DC-to-DC converter, application of this direct calculation is not sufficient to eliminate the steady-state error between the measured DC voltage and the setpoint. However, the error remains minor and is 30 V at most.

Figure 4:
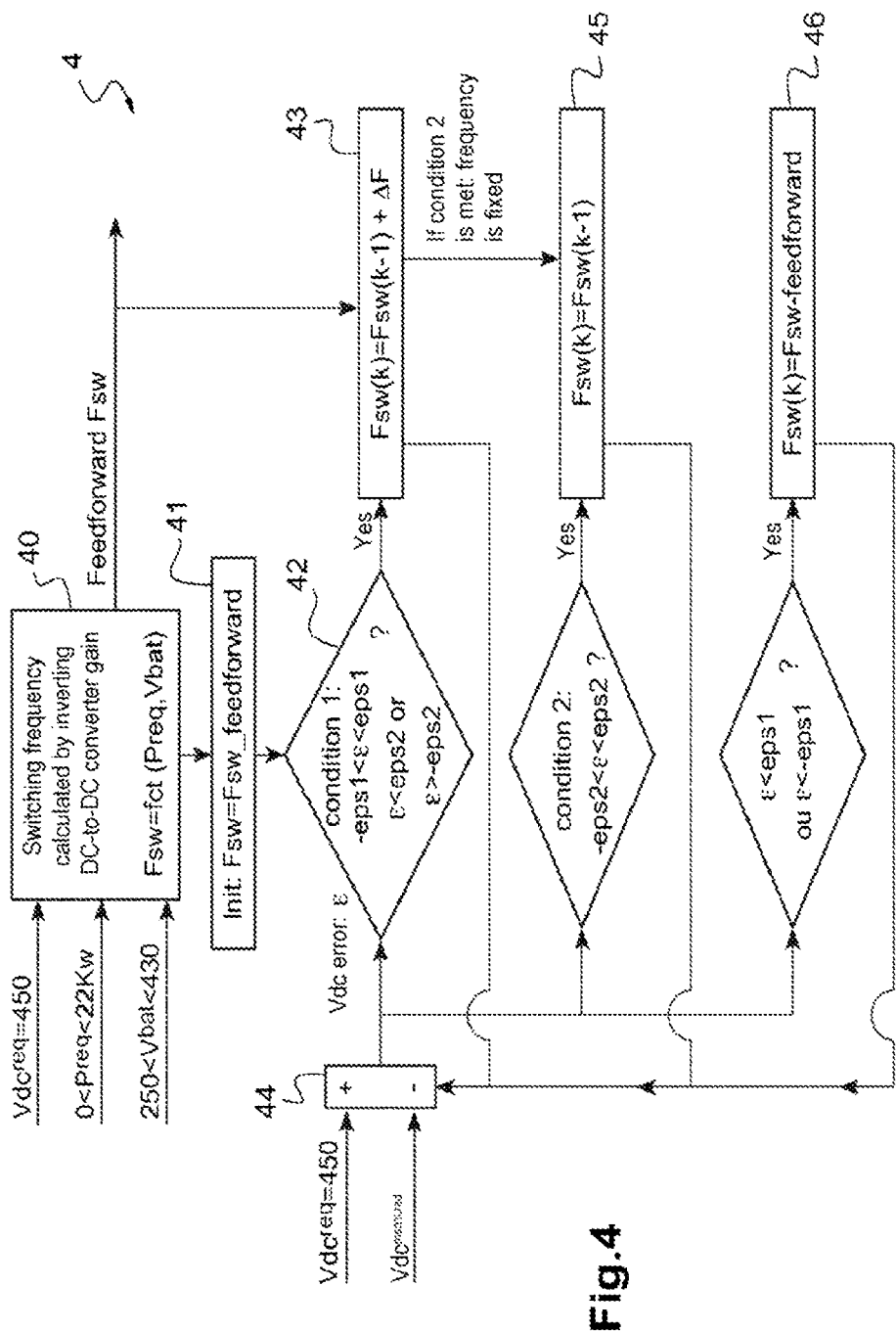
FIG. 4 is a flowchart of the control method according to one embodiment of the invention.

In order to overcome this problem, with reference to FIG. 4, a controller has been added to the previous feedforward. It operates by incrementing or decrementing the frequency until the steady-state error has been eliminated, and thus adjusts to a slightly greater extent the initial frequency generated by the previous calculation, for improved accuracy.

The controller according to the first embodiment is a discrete controller in which:
eps1 is a threshold value from which the frequency incrementation/decrementation begins;
eps2 is a threshold value for which the control frequency is fixed.

According to one embodiment with reference to FIG. 4, too, in a first step, the control frequency $f_{sw}(\omega)$, also known as the switching frequency $f_{sw}(\omega)$, is calculated 40 as described above, on the basis of a setpoint voltage $V_{DC}^{req}$, for example 450 V, a required power $P^{req}$, for example a power in the range $0 < P^{req} < 11$ kW, and on the basis of a battery voltage such that $250\,V < V_{bat} < 430\,V$.

The control frequency value $f_{sw}(k)$ is initialized 41 to the previously calculated initial frequency value $f_{sw\_feedforward}$.

Then, an error value ε between the setpoint voltage $V_{DC}^{req}$ and the measured input voltage $V_{dc}^{measured}$ of the DC-to-DC converter is calculated 44.

This error value ε is compared with two error threshold values eps1 and eps2.

If (condition 1) the error ε is between the limits of eps1 and −eps1, for example between 10 V and −10 V, and if, in addition, the error ε is greater than eps2 or lower than −eps2, these thresholds being, for example, V and −5 V, the initial frequency value $f_{sw\_feedforward}$ is incremented 43 by an increment of a frequency increment step ΔF, i.e.:

$$f_{sw}(k) = f_{sw\_feedforward} + \Delta F \quad (7)$$

k being a time integer.

After this step 43, the method loops back to step 44.

If (condition 2), after step 44, the error ε is between the limits of eps2 and −eps2, the frequency value $f_{sw}(k)$ which ensures a DC bus within a 5 V range of the setpoint is fixed and kept 45 at the previous value, i.e.:

$$f_{sw}(k) = f_{sw}(k-1)$$

the value $f_{sw}(k-1)$ being equal to $f_{sw\_feedforward}$ if condition 1 has not previously been met, or to $f_{sw\_feedforward} + k^* \Delta F$ if step 45 takes place after k previous steps 43.

If none of these conditions is met in step 44, the frequency value $f_{sw}(k)$ calculated by feedforward in step 40 is used 46. This value is updated periodically. The control operation will continue to apply the frequency calculated by feedforward as long as no condition in regard to the error is met, steps 43, 45 and 46 looping back to step 44.

The invention is not limited to the exemplary values given for the error thresholds eps1 and eps2. In particular, eps2 may be set to 1 or 0 V, depending on the feasibility of the operating point.

This method ensures convergence that is at a stable frequency, which is ensured by the feedforward action, and effective, by virtue of the action of the controller, which eliminates any remaining steady-state error and ensures that the DC bus accurately converges with the setpoint value.

The invention is not limited to the type of controller described in the first exemplary embodiment. A proportional-integral or proportional-integral-derivative controller can also be provided, the implementation of which is known to a person skilled in the art, although the tuning thereof is more complex than that of the controller in the first embodiment of the invention.

The invention claimed is:

1. A method of controlling a frequency of an input voltage of an LLC DC-to-DC converter which operates with a duty cycle of 50% and is frequency-controlled, comprising:
    defining a setpoint voltage value;
    calculating a control frequency value for said DC-to-DC converter, which is obtained by mathematical inversion of an expression of a gain of said DC-to-DC converter, based on an output battery voltage, an input power setpoint, and said setpoint input voltage; and
    applying the control frequency calculated by the calculating to said converter.

2. The method as claimed in claim 1, wherein said DC-to-DC converter is an LLC series resonant DC-to-DC converter, which is defined by parameters of an equivalent circuit comprising two inductors and a capacitor; and
    said control frequency value is a function of values of said two inductors and said capacitor.

3. The method as claimed in claim 1, wherein the applying the control frequency comprises:
   defining a frequency increment step;
   initializing the control frequency to an initial control value that corresponds to the control frequency calculated by the calculating;
   defining a first threshold value and a second threshold value, and an additive inverse of the first threshold value and an additive inverse of the second threshold value;
   calculating an error value between a measured input voltage value and said setpoint input voltage; and
   comparing said error value with said threshold values; and
   wherein the method further comprises regulating during which:
      when said error value is between the first threshold value and the additive inverse of the first threshold value, and when said error is higher than the second threshold value or lower than the additive inverse of the second threshold value, the control frequency is incremented by the frequency increment step;
      when said error value is between the second threshold value and the additive inverse of the second threshold value, the control frequency is kept at its previous value; and
      when none of these conditions is met, the initial control value is applied as the control frequency.

4. The method as claimed in claim 1, further comprising:
   providing feedback control of the control frequency.

5. A device configured to implement the method as claimed in claim 1.

6. A charger for electrical accumulators comprising:
   a power factor correction stage;
   at least one DC-to-DC converter; and
   the device as claimed in claim 5.

7. A motor vehicle comprising:
   the charger for electrical accumulators as claimed in claim 6.

* * * * *